United States Patent
De Smet

(10) Patent No.: US 7,347,557 B2
(45) Date of Patent: Mar. 25, 2008

(54) PROJECTOR SYSTEM COMPRISING PULSED LIGHT SOURCES

(75) Inventor: Herbert De Smet, Destelbergen (BE)

(73) Assignees: Interuniversitair Microelektronica Centrum vzw (IMEC), Leuven (BE); Universiteit Gent, Ghent (BE)

( * ) Notice: Subject to any disclaimer, the term of this patent is extended or adjusted under 35 U.S.C. 154(b) by 310 days.

(21) Appl. No.: 11/081,825

(22) Filed: Mar. 15, 2005

(65) Prior Publication Data

US 2005/0213051 A1 Sep. 29, 2005

Related U.S. Application Data

(60) Provisional application No. 60/614,839, filed on Sep. 30, 2004.

(30) Foreign Application Priority Data

Mar. 15, 2004 (GB) ................................. 0405747.7

(51) Int. Cl.
*G03B 21/14* (2006.01)
*G03B 21/20* (2006.01)
*G03B 21/26* (2006.01)
*G03B 21/00* (2006.01)
*G02F 1/1335* (2006.01)

(52) U.S. Cl. ............................ 353/20; 353/85; 353/94; 353/121; 349/9

(58) Field of Classification Search ................. 353/20, 353/31, 85, 94, 121; 348/742, 743, 744; 349/5, 7, 8, 9
See application file for complete search history.

(56) References Cited

U.S. PATENT DOCUMENTS 2,761,350 A 9/1956 Hornig

| 6,991,336 | B2 * | 1/2006 | Matsui | 353/94 |
| 7,165,845 | B2 * | 1/2007 | Takeda et al. | 353/31 |
| 2003/0021519 | A1 | 1/2003 | Zalevsky et al. | 385/16 |
| 2004/0041744 | A1 | 3/2004 | Inoue et al. | 345/1.3 |
| 2005/0128436 | A1 | 6/2005 | Matsui | 353/31 |

FOREIGN PATENT DOCUMENTS

| EP | 0888016 A1 | 12/1998 |
| EP | 1395064 | 3/2004 |
| EP | 1550909 A1 | 7/2005 |
| WO | WO 00/46631 | 8/2000 |
| WO | WO 2004/031850 | 4/2004 |

OTHER PUBLICATIONS

Partial European Search Report for Application No. EP05447055 dated Jul. 11, 2005.

* cited by examiner

*Primary Examiner*—Melissa Jan Koval
(74) *Attorney, Agent, or Firm*—Knobbe Martens Olson & Bear LLP

(57) ABSTRACT

A projection system comprising a light source is disclosed, wherein the light source comprises at least two light emitters arranged to be optically positionable alternately in a first position and a second position by an optical positioning means wherein said optical positioning means is arranged to change the light emission from said light emitters to a preferred optical path being said first position, a power source arranged to empower said light emitters, wherein the light emitter optically positioned in said first position is empowered by said power source and the light emitter optically positioned in said second position is not empowered.

17 Claims, 4 Drawing Sheets

PROJECTOR SYSTEM COMPRISING PULSED LIGHT SOURCES

CROSS-REFERENCE TO RELATED APPLICATION

This application claims priority to U.S. Provisional Patent Application 60/614,839 entitled "PROJECTOR SYSTEM COMPRISING PULSED LIGHT SOURCES" and filed on Sep. 30, 2004. The disclosure of the above-described filed application is hereby incorporated by reference in its entirety.

FIELD OF THE INVENTION

The present invention is related to an LED based projector system.

BACKGROUND OF THE TECHNOLOGY

Micro display technology is in most cases based on liquid crystal or MEMS technology. Typical projectors based on these technologies are the Liquid Crystal On Silicon (LCOS), Liquid Crystal Display (LCD) and Digital Light Processing (DLP™) projectors. In all these projectors the light source is practically always an Ultra High Performance (UHP) discharge arc lamp. This lamp has a very high power efficiency (lumen per watt) and étendue efficiency (lumen per unit étendue). Because of its small arc length, thus small étendue, it is very attractive for small light valves in micro display projectors.

An important property of any light beam is its étendue. It is a purely geometrical property. In simple wordings, it is the product of the beam cross-section with the spatial angle under which it travels and can be determined by multiplying the diameter or width of the limiting aperture by the angle of divergence of that aperture. The unit of étendue is $m^2 \times steradians$. From optics theory it follows that the étendue of a beam of light is invariant. If an optical component reduces the étendue of a beam of light, then this automatically implies that some of the light is lost. In a light valve projector, the importance of the étendue is that the optical component with the smallest étendue acceptance acts like a bottleneck for the whole system.

In a well-designed optical system, the étendue acceptances of all optical components are matched with each other. Usually, one of the components determines the étendue of the whole system and the others are matched to this component.

In light valve projectors, the light valve itself tends to be the étendue limiting component. That is a direct consequence of the facts that the price of the light valve component increases very rapidly with its dimensions, and that the light acceptance angle of the light valve is limited if a minimum image contrast is required.

The major consequence of this is that also the étendue of the matching light source is limited, which means that if one wants to increase the light output of the projector, one has to increase the light output of the light source without increasing its size or emission angles.

There are different types of LCOS color projectors, e.g. single panel (color sequential) and three panel systems. There are several known optical architectures for e.g. the three panel system. White light from the UHP lamp is, after some filtering, divided in three basic colors (R, G, B) by a set of dichroic mirrors. Afterwards, each color is independently modulated by another LCOS micro display (light valve). A so-called X-cube combines the three light paths and reflects the image to the projection lens.

This architecture where an UHP lamp is used as light source has many disadvantages. White light has to be divided into its basic components. For this, three dichroic mirrors are needed. This raises the price and enlarges the dimensions of the projector. Presence of UV and IR filters also raises the price. Each component has some losses, so the total optical output will be decreased. After splitting in (R, G, B)-components, each color still has a relatively wide spectrum and this leads to a reduced color gamut.

Another important disadvantage of an UHP lamp is the short lifetime. Normally a component has an average lifetime of 25000 hours. UHP lamps, with 5000 hours, limit the projector lifetime drastically. The other components have a much longer lifetime, therefore it would be advantageous to provide another light engine that could operate for a longer time.

Other disadvantages are the high driving voltage, large volume due to cooling, price, the presence of mercury and danger of explosion. These aspects make the projector also less portable.

There is a great interest in using LEDs (light emitting diodes) or lasers as the light source for a future generation of image projectors. LEDs and lasers have a number of advantages over the now widely used UHP lamps, such as longer lifetime, no explosion hazard, no risk of toxic exhaust at end of life (cf. Hg in UHP lamps), shock resistance, lightweight, very pure basic colours (narrowband) (resulting in a wider colour gamut), possibility to use pulsed addressing (important for colour-sequential operation), and no waste of energy to produce photons with wavelengths that are unwanted (wavelengths between the primary colours).

The major drawback of LEDs to date is the limited light output per unit of emitting area. This is an important limitation for a light source that is considered for use in a light valve based projector.

In recent years, LEDs have become more and more efficient. Many methods to increase the efficiency are based on modifications of the direct LED surroundings (substrate, encapsulation, . . . ) in order to increase the light outcoupling efficiency. These methods as a rule also increase the apparent size of the LEDs, and hence their étendue. Therefore, this does not beneficially influence the efficiency of such a LED in a projection system, unless the étendue of the enlarged LED still matches with the étendue acceptance of the light valve. Nowadays, the maximum LED power that matches with a typical LCOS light valve (0.8" diagonal) is about 5 Watts.

LEDs are robust and have very long operating time (up to 100 k hours) compared with UHP lamps. This will enlarge the lifetime of the projector drastically. Because of their small size, low operating voltage and the absence of dangerous mercury and explosion hazard, they could be ideal light sources for inexpensive, compact, portable projection systems that even can be run on batteries. The robustness of the light source will result in robust projectors with low maintenance cost.

LEDs are light sources with a narrow spectral emission band, nearly monochromatic, which will lead to a large color gamut. This will increase the number of possible color combinations and thus the image quality. The contrast can be improved by a unique property of LEDs, namely unlike UHP lamps they have a large dimming ratio. By dimming the LEDs for dark images the dynamic range will be adapted and will result in very high contrast. This technique is known as 'Adaptive Dynamic Range Control' and is used in classic projectors. The dimming happens there with a mechanical shutter and will be thus easier and faster with LEDs. Another very interesting aspect is the fact that LEDs can be switched rapidly, meaning that LEDs can be pulsed. Pulsing is a very interesting property in case of color sequential architecture, but it can also be used to get a higher light flux in three panel system.

However, there is also an important disadvantage. LED intensities are still too low for actual projection application. The optical power per unit of étendue of a LED is also significantly lower than that of an UHP lamp (approximately 50 times). Even the brightest LEDs cannot equalise the efficiency of this arc lamp. Nowadays this problem is the bottleneck of the LED based projection systems.

An idea that is formulated on many occasions is to combine the light coming from different LEDs in order to increase the light output. The major problem is that most methods to combine the light coming from two separate light sources also add up the étendue of the two light beams. There are a number of known ways to combine two or more light sources without increasing the resulting étendue.

One method is to use a polarising beam splitter (PBS) to combine two light beams with mutually orthogonal linear polarisation, yielding a single beam with mixed polarisation. Unfortunately, this cannot be used for liquid crystal based projectors, because one needs polarised light in order for the light valve to work. Furthermore, LEDs produced today do not generate polarised light, so in order to generate the linearly polarised light, one would first have to split the unpolarised light into two beams with mutually orthogonal polarisation. This would double the étendue of the original light beam, so one ends up with a break-even situation at best. Still, the technique could be used with lasers (which usually do generate polarised light), provided a polarisation-insensitive light valve is used (such as a DLP valve).

A second method is to use an X-Cube or a set of dichroic mirrors and to combine the light coming from light sources with non-overlapping spectra (different colours). For example, a standard X-cube can combine a red, a green and a blue beam into a single white beam with the same étendue. In fact, this technique is already used in all 3-valve projectors. In the case of using UHP lamps, the white light from the lamp is first split into a red, a green and a blue channel, which implies a tripling of the beam étendue, and later it is recombined again to a single beam using an X-Cube. In the case of monochromatic light sources, such as LEDs, each of the light sources is allowed to have the same étendue as the UHP lamp. This is in fact an unlisted advantage of LEDs versus UHP lamps: the light output of the UHP lamp has to be compared with the light output of the red, green and blue LEDs together.

EP 1395064 discloses a projector system, which uses LEDs as the light source. In this document, the LEDs are mounted on a movable support, which is designed to bring the LEDs alternately in front of the optical system. The LEDs are pulsed alternately in order to obtain a higher flux. In an alternative embodiment, a rotatable mirror placed at an angle of 45° is used to reflect the light of alternately pulsed LEDs placed on the inner surface of a cylinder, to guide the light to the optical system of the device. The functioning of this device depends heavily on timing between mechanical elements (positioning devices, mirror rotation) and electronic components (LEDs). Also, mechanical elements are known to fail more easily and to be subject to wear. Further, such a device would be very costly.

To solve the problems mentioned above, another light source is needed.

SUMMARY OF CERTAIN INVENTIVE EMBODIMENTS

Aspects of the present invention aim to provide a novel projection system light source, which is cheap and efficient and does not show the disadvantages of a classic UHP light source as described above. A further aim is to provide a light source, which is robust and does not rely on mechanical elements.

Aspects of the present invention also aim to provide a novel method for improving the LED light source intensity for a projector system.

An aspect of the present invention concerns a projection system comprising a light source, said light source comprising at least two light emitters arranged to be optically positionable alternately in a first position and a second position by an optical positioning means wherein said optical positioning means is arranged to change the light emission from said light emitters to a preferred optical path being said first position; a power source arranged to empower said light emitters; wherein the light emitter optically positioned in said first position is empowered by said power source and the light emitter optically positioned in said second position is not empowered. Preferably, said optical positioning means comprises optical modification means for modifying a predetermined optical property of the light source. Said optical positioning means is thus arranged to change the optical properties or path of the light that is emitted by the light emitters. Preferably, said optical positioning means do not comprise mechanically moving parts. In a first embodiment, said optical positioning means comprises a PBS and a switchable device arranged to rotate the polarisation direction of the light over a specified angle. Advantageously, said switchable device is an FLC. The projection system can further comprise a polarizer positioned between the light source and the PBS.

In a second embodiment, said optical positioning means comprises a circular mirror rotatable around its axis and placed in the bisector plane formed by said two light emitters, said mirror comprising mirroring and transparent sectors.

Preferably, said projection system is an image projector system, in particular a light valve projector.

The projection system preferably comprises a switch to alternately empower said light sources. Advantageously, said switch is an electronic circuit.

The power source is preferably arranged to empower the light emitters with a current pulse.

Said light emitter is preferably a light emitting diode (LED) or a laser.

In a preferred embodiment of the present invention, the light emitters are positioned orthogonal with respect to each other.

The projection system can of course comprise a plurality of light sources as described above, arranged to be optically positionable alternately in a first position and a second position by an optical positioning means wherein said optical positioning means is arranged to change the light emission from said light sources to a preferred optical path.

Another aspect of the present invention concerns a method for providing light to a projection system, comprising the steps of:
Providing a projection system according to the present invention,
Alternately optically repositioning one of the light emitters in the second position and optically positioning another light emitter in the first position, and Providing a pulse current to a light emitter that is optically positioned in the first position.

Preferably, the step of repositioning is performed using a PBS and a switchable device arranged to rotate the polarisation direction of the light over a specified angle.

Alternatively, the step of repositioning can be performed using a circular mirror rotatable around its axis and placed in the bisector plane formed by said two light emitters, said mirror comprising mirroring and transparent sectors.

DETAILED DESCRIPTION OF CERTAIN INVENTIVE EMBODIMENTS

In the present invention, a new projector system is disclosed. Furthermore, a new method of combining the light from different light sources without increasing the étendue is disclosed.

The following description will refer to a LED (light emitting diode). It is however understood that this is only for the purpose of having an example and it is understood that the term "LED" can be replaced by any other suitable light source, e.g. a laser.

Figure 1:
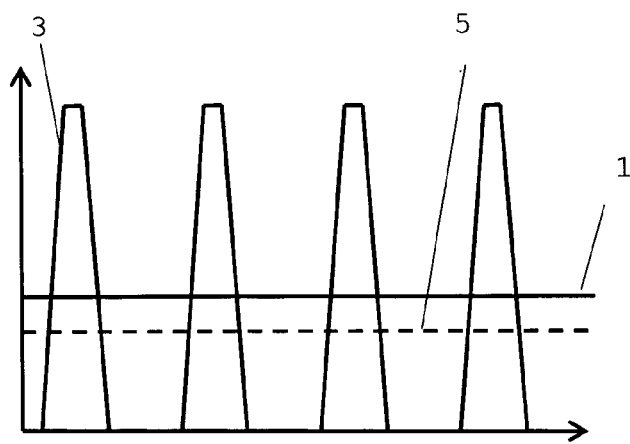
FIG. 1 represents a theoretical comparison chart between the average light flux from a continuously driven LED and from the same LED, in a pulsed system.

A single LED or another single light source can be operated in a pulsed mode. The power limitation of the LED is partly related to thermal effects (heating): if the driving current is increased above a certain value, the LED will heat up too much and will deteriorate quickly or even fail. In high-power LED applications, much attention is given to the thermal housekeeping of the LED and its package, so that the cooling is optimal. This allows for higher driving currents and hence higher light output. Operated in pulsed mode, a LED is operated during a short time, and then given the opportunity to cool down, after which the cycle is repeated. Depending on the duty ratio and the repetition frequency, the maximum allowable drive current can be higher or much higher than in continuous driving mode. The peak light output (3, see FIG. 1) will consequently also be higher. In general however, the mean light output (5, integrated over a complete cycle, see FIG. 1) is not higher than the output in the case of continuous drive (1, see FIG. 1).

To increase the optical power a number of possible solutions can be formulated. The output power of a LED can be increased by increasing the radiating area. By multiplying ten times the active region, the flux, but also LED's étendue, will been multiplied almost by ten. This gain will not contribute to the output flux because the throughput of a projector is determined by the system étendue. This is usually defined by the F-number of the projection lens and the area of the micro display. The étendue of the light source should not be larger than the system étendue. So enlarging the active region will not result in increased throughput if the LED étendue is larger than the system étendue.

A better method is increasing the flux within the same étendue. This can be done by combining several LEDs or by pulsing the LEDs. Several LEDs can be combined within the same étendue, if they have different wavelengths (spectra) or different polarization.

Figure 2:
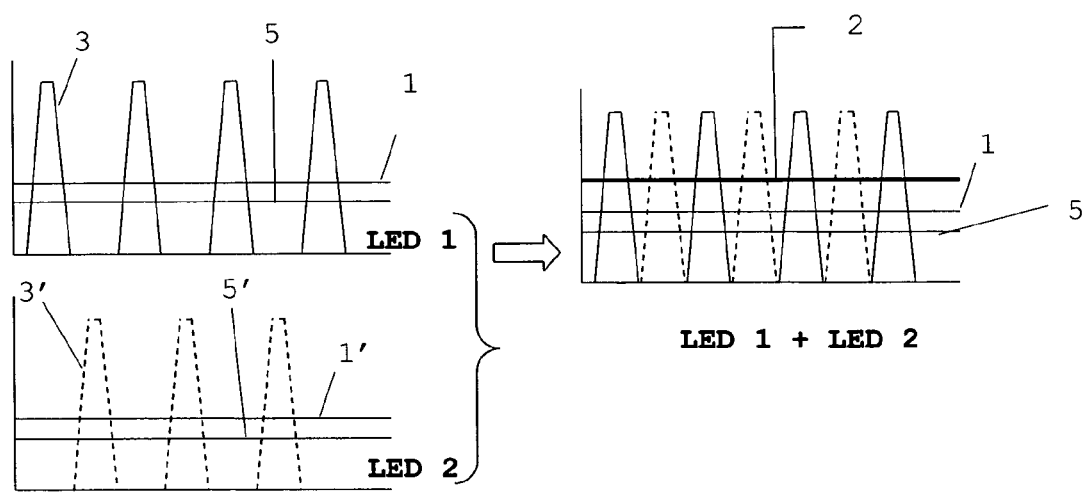
FIG. 2 represents the effects of the combining of the light from to alternately pulsed LEDs.

To increase the average luminance, one can combine several LEDs, pulsed alternately, so one can combine LEDs with the same wavelength and putting them (physically or optically) in a certain preferred position during the time interval that they are pulsed. Their increased flux can be added up in time and will generate a higher average flux within the same étendue. This can be carried out in a number of different configurations and is illustrated in FIG. 2. LEDs 1 and 2 have an average light output 1 and 1'. When pulsed, peak output 3 and 3' is observed, but on the average light output 5 and 5' of the LEDs separately is lower than the average continuously driven output 1 or 1'. When alternately pulsing LEDs 1 and 2 and combining the peak output 3 and 3', a higher average output 2 is obtained.

Figure 3:
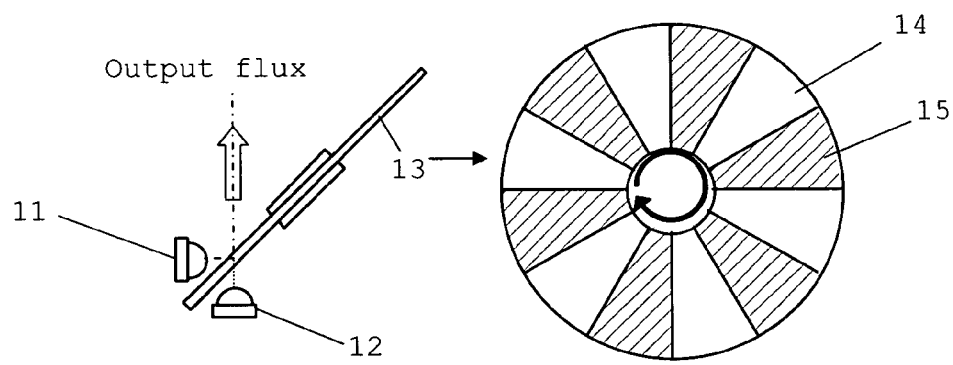
FIG. 3 shows an embodiment comprising two orthogonally positioned LEDs and a rotating mirror.
Figure 4:
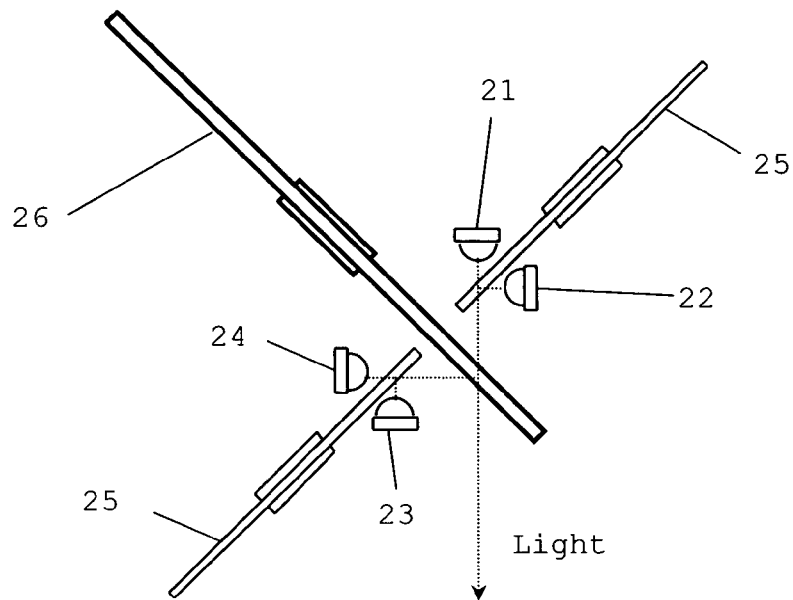
FIG. 4 shows an extended version of the embodiment of FIG. 3.

An example of such a configuration is shown in FIG. 3. Here one works with two LEDs (11, 12) that are positioned orthogonal to each other. A rotating mirror wheel (13) that consists of mirroring (15) and transparent segments (14) is positioned in the bisector plane formed by the two LEDs. Each LED is working at a 50% duty ratio. When a mirroring segment is between the LEDs, the horizontal LED is pulsed, when a transparent segment is between the LED's, the vertical LED is pulsed. This results in a light beam that appears to be generated by a single vertical LED. This approach can also be expanded to 4, 8, etc. LEDs as illustrated in FIG. 4 but the architecture rapidly become larger and more complicated. For example in FIG. 4, to operate 4 LEDs (21, 22, 23, 24) one needs two three rotating mirrors (25, 26) to combine the light of all LEDs.

An important disadvantage of these kind of solutions is the presence of moving parts. In optical systems, moving parts are undesirable. They always show slowness, can cause extra errors (alignment) and will wear out more quickly.

An alternative on the system with two LEDs without moving components comprises a PBS (polarising beam splitter) and a switchable retarder (half wave plate filter). By alternately pulsing the LED's with 50% duty cycle and changing the polarization of one LED with a switchable retarder, one can combine the flux of both LEDs in the same étendue. The output beam will have a constant polarization and the other polarization, which in any case should be filtered out before the imager, will be lost. The retarder should synchronously switch on and off with the LEDs and should have very small transition time to have a minimal loss. Because of its fast switching time a ferro-electric retarder (FLC) can be used here. The following example shows a possible setup and the principle of this system. Other retarder possibilities include an LC (liquid crystal), Kerr and Pockels cells, or a Faraday rotator.

EXAMPLE 1

Test Setup for Measuring

Figure 5:
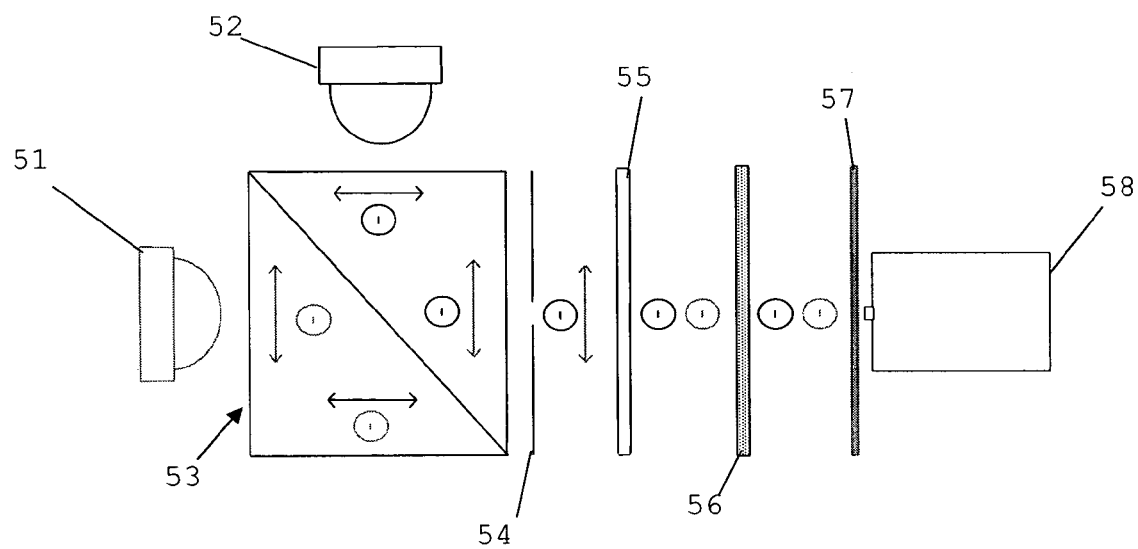
FIG. 5 shows the measurement system used for experimentally measuring the gain with a setup according to an embodiment of the present invention.
Figure 6:
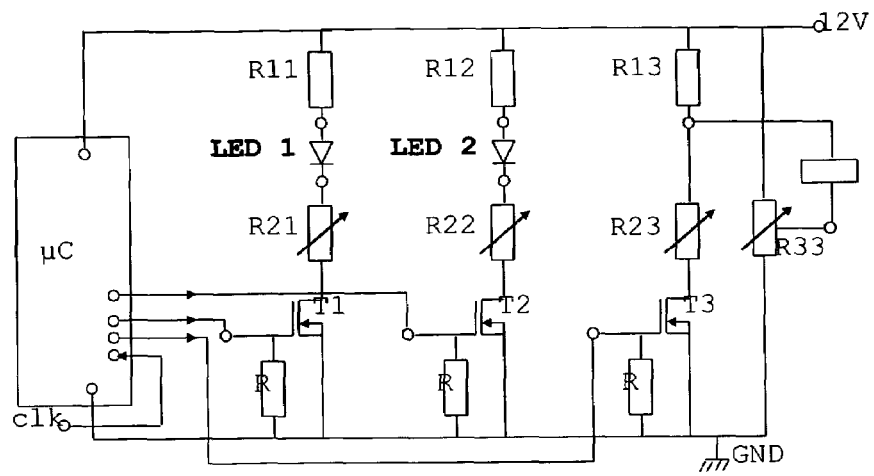
FIG. 6 shows an electronic circuit that can be used to drive the pulsed LED system according to an embodiment of the present invention.

Referring to FIG. 5, LED 1 (51) and LED 2 (52) can be alternately pulsed and are preferably synchronous. The pulsed current depends on the duty cycle and the type of the LEDs. Luxeon V Emitter Lambertian green is used in this example. Green is the limiting LED if one wants to build a three panel projector with red, green and blue Lumileds. The continuous driving current is 700 mA and the consumed power is about 5W. If the duty cycle is 50% with the same electrical power, the pulsed driving current has to be 1260 mA, and in case of 33% duty cycle 1750 mA. That was determined experimentally. Because of high consumed powers, fans are used to cool down the LEDs. An electronic circuit that can manage such high currents is shown in FIG. 6. This circuit also provides synchronized signals for LED 1, LED 2 and the FLC (55). This circuit will be discussed below.

The FLC (55) used in this example is a product of Displaytech. It has a clear aperture of 25.4 mm and is optimized for the entire visible region. The broadband spectral response is greatly improved by sacrificing peak contrast. On both sides an anti-reflection coating is added. The FLC has two states that can be switched with a square wave with amplitude of 5V (between + and −5V). This is also realized with the same circuit that drives the LEDs. In the off state (−5V) the FLC is transparent and in the on state (+5V) it will act as a half wave plate, thus changing the polarization of the incoming light. The FLC (55) can be switched very fast compared with a normal liquid crystal cell.

The detector (58) used is an Avalanche Photo Diode (APD) from Hamamatsu (c5460-01) with a small active region. This device is ultra sensitive and will saturate if the light beam is not attenuated. Therefore an attenuator (57) is placed in front of the detector (58). Also included is a diaphragm (54) after the PBS (53) to reduce the light spot to the size of the detector's active area. With the polarizer (56) (analyzer) between the FLC (55) and the attenuator (57), one can select which polarization state will be passed to the detector (58).

The PBS (53) in the setup has anti-reflection coatings on all faces. This will minimize losses. It readily polarizes the beam and passes p polarization for LED 1 (51) and s polarization for LED 2 (52). After going through the diaphragm (54), the beam passes through the FLC (55). The FLC (55) is driven in such a way that it will pass the beam (s polarization) from LED 2 (52) and change the polarization of the beam from LED 1 (51) (from p into s polarization). Afterwards the beam will pass through the analyzer (56) that is oriented in the direction of the incoming s polarized beam. After attenuation (57) the optical power is converted into a voltage by the detector and measured with the oscilloscope. This voltage value is a relative indication for the quantity of the flux that falls in the detector (58).

It was already mentioned that there are two important items that are preferably taken into account when designing the driving circuit, namely the current that the circuit should deliver and the synchronization of the three channels (LED1, LED2 and FLC). Another important item is the velocity of switching. The circuit that is designed exists of two parts and is shown in FIG. 6.

The electronic part is a transistor circuit where the transistors are used as switches. The transistors used are high speed switching types with high current capabilities. This is needed to pulse at high currents (up to 1.75 A). For LED 1 en LED 2 two identical circuits are designed. R11 (R12) is a monitor resistance to measure the adjusted current. This current will be programmed by an adjustable resistance R21 (R22). The third part is used to drive the FLC. R13 is 100 Ω and will provide a potential difference of 10V if the current is adjusted at 100 mA, which is done using R23. The potential at one terminal of the FLC will be switched between 12V (off) and 2V (on). The other terminal is set at 7V by R33. The transistors will only be switched when the gates become digitally high (5V). This will be done through the signals coming from the second part, the firmware part, of the circuit. For this a micro controller is used. The micro controller (µC) has an internal clock signal of 12 MHz and will be very accurate in timing. This was needed for synchronization. Even the three pins of the µC that will drive the gates will be written exactly at the same time. Another advantage of a µC system is the flexibility of the desired triggering signal and the ease of adaptation. For example, one can change the duty cycle from 50% to 33% without any change of the circuit, by loading another assembler code. With an extern clock signal the frequency will be determined.

Figure 7:
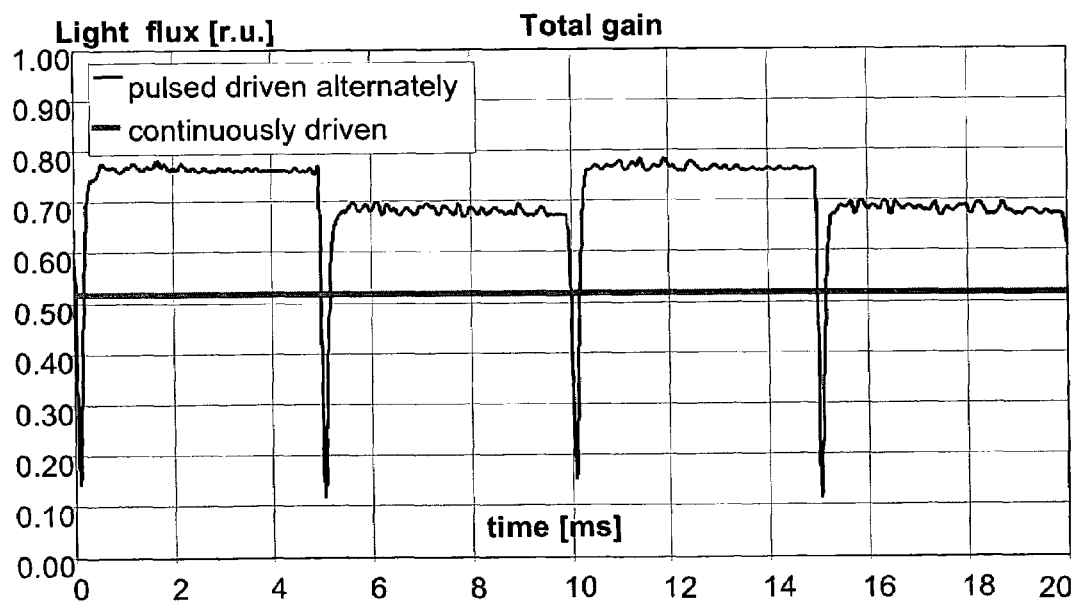
FIG. 7 shows the experimentally obtained results for a setup as in FIG. 5.

For the above setup, in a duty cycle of 50%, 135,8% polarised light was obtained (compared to a continuously driven LED), so about 36% more light. There are losses in the system, more in particular due to e.g. non-ideal characteristics of the LEDs and loss of light in the PBS and the FLC. The graph of the measurements can be seen in FIG. 7.

Though the gain is substantially good, it can still be improved. The major loss is due to the pulsing efficiency and will always occur but can perhaps be reduced by improvements of the LED technology. The performance of the PBS can also be raised by optimizing it for one wavelength and using a better PBS, so this loss can be reduced by factor 2 to 3. The loss of the FLC can also be decreased a little bit by using another square signal to drive it. The FLC should be driven for a very short time (tens of microseconds) with higher voltage up to +/−15V. Longer period at this voltage can damage the FLC.

Figure 8:
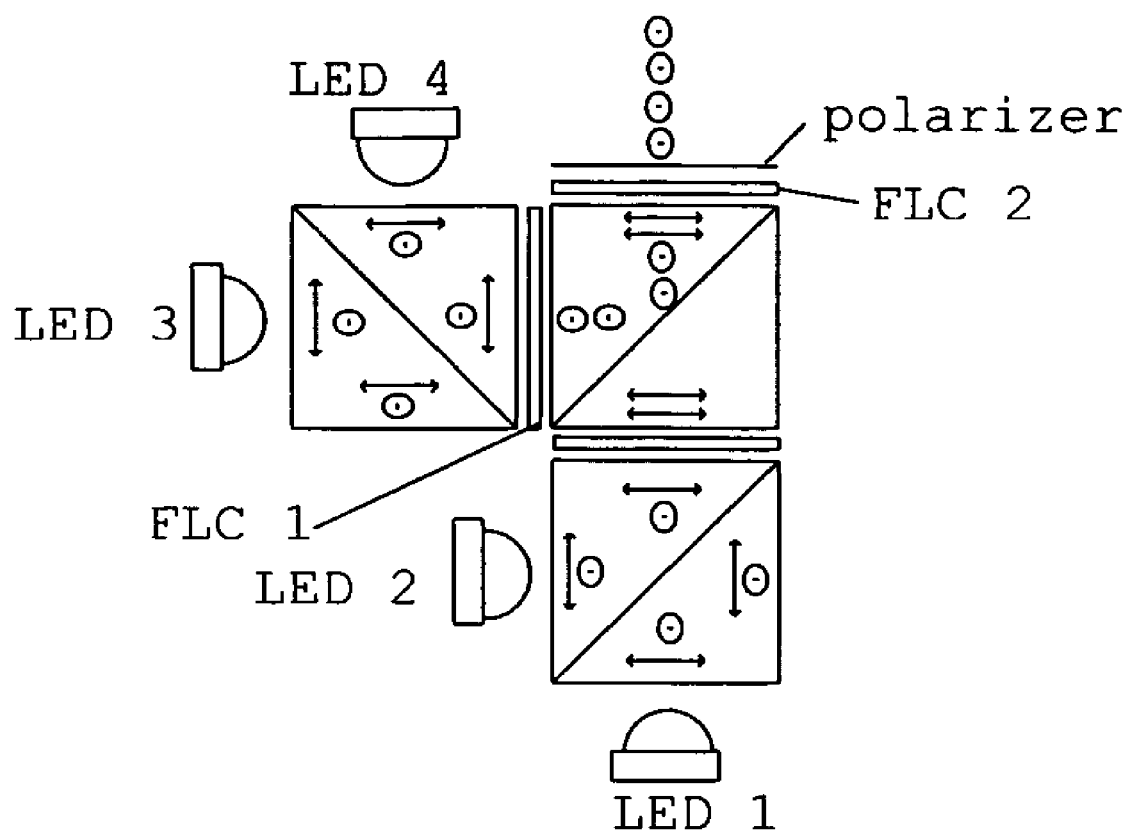
FIG. 8 shows an extended system with 4 alternately pulsed LED's at 25% duty cycle.

This system can be expanded to increase the total gain. A possible expansion is shown in FIG. 8.

In this architecture the LEDs should be pulsed with 25% duty cycle. The pulsing loss will higher but by combining 4 LED's the overall gain will be higher. Additional losses will occur, namely there is one PBS and one FLC more used in the setup. The FLCs at the first stage (FLC1) have to switch twice as fast as the FLC in the second stage (FLC2) (and the FLC used in the two-LED setup). This will also cause some losses. The estimated gain is about 69% (nearly double as before), at the expense of a larger, more complicated and more expensive architecture. More elaborate systems with $2^n$ LEDs are possible, using the 2 LED or 4 LED systems described above as building blocks and combining the light emitted by such building blocks in a similar way.

Timing issues are important. Depending on LED on time and transition times for the switchable retarder, the driving circuit has to be designed such to allow a flicker-free image. Typical values for LED on time is <about 100 ns. The LED off time is less important and is typically situated around 1 µs. The switchable retarder is also an important factor. An FLC typically has a transition time of about 80 µs. An LC has a much higher transition time situated around a few ms. As most of these elements have short on or transition time characteristics, it is possible to work at a frequency of e.g. 100 Hz to provide a flicker-free light source.

In case a relatively slow switchable retarder is used, it is possible to work at lower frequencies (such as 10 Hz) in order to increase the LED on period and to reduce the switching per second. A switching time of about 2 ms and a LED on period of about 50 ms, working at about 10 Hz can provide a flicker-free light source.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

The invention claimed is:

1. A projection system comprising a light source, the light source comprising:
   at least two light emitters arranged to be optically positionable alternately in a first position and a second position by an optical positioning device, wherein the optical positioning device is arranged to change the light emission from one of the light emitters to a preferred optical path such that the one light emitter is in the first position; and
   a power source arranged to power the light emitters, wherein the light emitter optically positioned in the first position is powered by the power source and the light emitter optically positioned in the second position is not powered,
   wherein the light emitters and the optical positioning device do not move relative to the preferred optical path, and wherein the optical positioning device does not comprise mechanically moving parts.

2. The projection system of claim 1, wherein the optical positioning device comprises an optical modification device configured to modify a predetermined optical property of the light source.

3. The projection system of claim 1, wherein the optical positioning device comprises a polarizing beam splitter (PBS) and a switchable device arranged to rotate the polarization direction of the light over a specified angle.

4. The projection system of claim 3, wherein the switchable device arranged to rotate the polarization direction of the light over a specified angle is a ferro-electric retarder (FLC).

5. The projection system of claim 3, further comprising a polarizer positioned between the light source and the PBS.

6. The projection system of claim 1, wherein the projection system is an image projector system, in particular a light valve projector.

7. The projection system of claim 1, comprising a switch to alternately power the light sources.

8. The projection system as in claim 7, wherein the switch is an electronic circuit.

9. The projection system of claim 1, wherein the power source is configured to power the light emitters with a current pulse.

10. The projection system of claim 1, wherein the light emitters comprise at least one of a light emitting diode (LED) and a laser.

11. The projection system of claim 1, wherein the light emitters are positioned orthogonal with respect to each other.

12. The projection system of claim 1, comprising a plurality of light sources configured to he optically positionable alternately in a first position and a second position by an optical positioning device, wherein the optical positioning device is arranged to change the light emission from the plurality of light sources to a preferred optical path.

13. A method for providing light to a projection system, comprising:
   providing a projection system comprising a light source, the light source comprising:
      at least two light emitters arranged to be optically positionable alternately in a first position and a second position by an optical positioning device, wherein the optical positioning device is arranged to change the light emission from one of the light emitters to a preferred optical path such that the one light emitter is in the first position,
      a power source arranged to power the light emitters, wherein the light emitter optically positioned in the first position is powered by the power source and the light emitter optically positioned in the second position is not powered, wherein the light emitters and the optical positioning device do not move relative to the preferred optical path, and wherein the optical positioning device does not comprise mechanically moving parts;
   alternately optically repositioning one of the light emitters in the second position and optically positioning another light emitter in the first position; and
   providing a pulse current to a light emitter that is optically positioned in the first position.

14. The method as in claim 13, wherein repositioning is performed using a polarizing beam splitter (PBS) and a switchable device configured to rotate the polarization direction of the light over a specified angle.

15. A projection system comprising a light source, the light source comprising:
   at least two light emitters arranged to be optically positionable alternately in a first position and a second position by an optical positioning device, wherein the optical positioning device is arranged to change the light emission from one of the light emitters to a preferred optical path such that the one light emitter is in the first position; and
   a power source arranged to power the light emitters, wherein the light emitter optically positioned in the first position is powered by the power source and the light emitter optically positioned in the second position is not powered,
   wherein the light emitters and the optical positioning device are stationary relative to the optical path, and wherein the optical positioning device does not comprise mechanically moving pads.

16. A projection system comprising a light source, the light source comprising:
   at least two light emitters arranged to be optically positionable alternately in a first position and a second position by an optical positioning device, wherein the optical positioning device is arranged to change the light emission from one of the light emitters to a preferred optical path such that the one light emitter is in the first position; and
   a power source arranged to power the light emitters, wherein the light emitter optically positioned in the first position is powered by the power source and the light emitter optically positioned in the second position is not powered, wherein the optical positioning device comprises a polarizing beam splitter (PBS) and a switchable device arranged to rotate the polarization direction of the light over a specified angle.

17. A method for providing light to a projection system, comprising:

providing a projection system comprising a light source, the light source comprising:

at least two light emitters arranged to be optically positionable alternately in a first position and a second position by an optical positioning device, wherein the optical positioning device is arranged to change the light emission from one of the light emitters to a preferred optical path such that the one light emitter is in the first position, a power source arranged to power the light emitters, wherein the light emitter optically positioned in the first position is powered by the power source and the light emitter optically positioned in the second position is not powered;

alternately optically repositioning one of the light emitters in the second position and optically positioning another light emitter in the first position, wherein repositioning is performed using a polarizing beam splitter (PBS) and a switchable device configured to rotate the polarization direction of the light over a specified angle; and providing a pulse current to a light emitter that is optically positioned in the first position.

* * * * *